Patented Dec. 15, 1953

2,662,905

UNITED STATES PATENT OFFICE 2,662,905

STABILIZATION OF GLYCERIDE OILS WITH CARBOXYMETHYL MERCAPTOSUCCINIC ACID

Arthur W. Schwab, Patricia M. Cooney, and Cyril D. Evans, Peoria, Ill., assignors to the United States of America as represented by the Secretary of Agriculture No Drawing. Application October 5, 1951, Serial No. 250,008

5 Claims. (Cl. 260—398.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the treatment of glyceride oils or fats and such related materials as synthetically produced esters of long chain fatty acids, and edible compositions comprising fats of animal or vegetable origin. It relates particularly to the treatment of such fatty substances to prevent oxidative deterioration and to increase the storage life and utility of such fatty substances as food materials.

Glyceride oils of animal or vegetable origin are known to deteriorate more or less rapidly in storage and to develop off-flavors and odors which reduce their utility and value as food materials or as ingredients in pharmaceutical or cosmetic compositions. This deterioration is mainly due to oxidative processes which are extremely difficult to control. Difficulty of control is due largely to the presence of small quantities of metals which act as autoxidation catalysts.

According to this invention, glyceride oils which contain small quantities of metallic constituents of the class which possesses oxidative catalytic properties are treated to remove such metals or to neutralize their catalytic effect, thus increasing the oxidative stability of the oil.

We have discovered that carboxymethyl mercaptosuccinic acid,

HOOCCH₂CH(COOH)SCH₂COOH when added to glyceride oils, or the glyceride oil derivatives previously mentioned, imparts to such materials improved flavor and oxidative stability. This acid apparently has the ability to remove from action the metals, such as iron and copper, which commonly act as autoxidation catalysts in the oils.

Accordingly, we utilize our discoveries to increase the oxidative and flavor stability of glycerides, particularly vegetable oils, such as soybean oil, perilla oil, cottonseed oil, peanut oil, mustard seed oil, corn oil, safflower oil and the like, by adding thereto stabilizing amounts of carboxymethyl mercaptosuccinic acid. The effect of this stabilizer is pronounced, either upon the raw oils, oils refined by conventional procedure, particularly in the case of oils bearing appreciable amounts of iron or copper.

Glyceride oils vary in their natural stability and also vary in their content of heavy metal impurities. In the case of commercially refined edible oils of various agronomic origins, the iron content has been found to vary as much as one hundred fold, ranging from 0.03 part per million upward. Likewise, the copper content has been found to vary as much as ten fold, from 0.01 part per million up to 0.1 part per million. Moreover, the metal equipment with which the oil comes in contact during handling is believed to contribute somewhat to the heavy metal content of the oil.

According to our invention, the carboxymethyl mercaptosuccinic acid is added to the oil at relatively cool temperatures. We prefer to add it, in the case of refined oils, on the cooling side of the steam deodorization step. It is preferable to limit the temperature at which the addition is made to below 100° C., although higher temperatures may be employed if care is taken to minimize the time at which the oil is held at temperatures above 100° C. The addition of the stabilizer is relatively simple, since it is readily dispersible in the oil. It may be added to the oil in an amount ranging from 0.001 to 0.1 percent based on the weight of the oil. It is convenient to add the stabilizer in alcoholic solution, subsequently removing the solvent alcohol by evaporation. However, a wide variety of means of addition is satisfactory and will readily occur to those skilled in the art.

In the following examples, samples of oil were deodorized in a laboratory steam deodorizer for 3 hours at 210° C., and were treated with carboxymethyl mercaptosuccinic acid on the cooling side of the deodorization step. Control samples containing no stabilizer were also subjected to the tests for purposes of comparison. As a further basis for comparison, oil samples containing added catalytically active metals were also evaluated, both with and without the stabilizer.

A chemical evaluation, based on the active oxygen method (Swift Stability Test) was made, which provides the peroxide values, taken after the samples are blown with air for 8 hours at 208° F. These are termed the A. O. M. values. The oils were also evaluated organoleptically. The taste panel was composed of persons skilled in taste testing, and the flavor scores given below are based on a 1 to 10 scoring system in which the highest score is 10. A flavor score of 6.0 or higher indicates an acceptable oil. The results are shown in Table I.

Table I

| Oil | Control | | | | 0.01% carboxymethyl mercaptosuccinic acid | | | |
|---|---|---|---|---|---|---|---|---|
| | A. O. M. | Flavor score | | | A. O. M. | Flavor score | | |
| | | At 0 time | Stored 4 days at 60° C. | Stored 8 days at 60° C. | | At 0 time | Stored 4 days at 60° C. | Stored 8 days at 60° C. |
| Oil No. 1, soybean | 20.9 | | | | 3.2 | | | |
| Oil No. 1+0.3 p. p. m. Fe | 247.2 | | | | 7.8 | | | |
| Oil No. 2, soybean | 44.5 | 8.9 | 6.5 | | 1.7 | 8.9 | 7.4 | |
| Oil No. 2+0.3 p. p. m. Fe | 124.6 | 3.5 | 2.6 | | 2.4 | 7.7 | 6.7 | |
| Oil No. 3, soybean | 55.6 | 7.9 | 6.1 | | 1.8 | 8.9 | 7.7 | |
| Oil No. 3+0.1 p. p. m. Cu | 177.5 | 3.4 | 2.5 | | 2.2 | 8.7 | 7.5 | |
| Oil No. 4, cottonseed | 37.0 | | | | 13.1 | | | |
| Oil No. 4+0.3 p. p. m. Fe | 264.0 | | | | 18.1 | | | |
| Oil No. 5, peanut | 12.2 | | | | 4.0 | | | |
| Oil No. 6, soybean | 44.1 | 8.5 | 3.8 | 2.7 | 4.6 | 9.2 | 7.3 | 6.3 |
| Oil No. 6+0.3 p. p. m. Fe | | | | | 10.6 | 7.2 | 5.8 | 5.9 |
| Oil No. 7, soybean | 23.6 | 7.3 | 5.5 | 3.2 | | | | |

In another series of experiments, three samples of soybean oil, having a measured A. O. M. value of 33.7, were treated with varying amounts of stabilizer in the same manner as the oils of the foregoing series. The A. O. M. values are shown in Table II.

Table II

| Oil | A. O. M. |
|---|---|
| Oil No. 8, soybean | 33.7 |
| Oil No. 8+0.005% carboxymethyl mercaptosuccinic acid | 2.1 |
| Oil No. 8+0.01% carboxymethyl mercaptosuccinic acid | 2.0 |
| Oil No. 8+0.1% carboxymethyl mercaptosuccinic acid | 1.8 |

The oils in the foregoing tests may be replaced by other glyceride oils or fats with similar results; for example, corn oil, perilla oil, safflower oil, lard, lard oil, or tallow.

A major object in preserving oils against oxidative deterioration is to prevent the development of unpleasant flavors as manifested by the taste and odor of the oil. Deterioration causes the development of grassy, rancid, and painty flavors. The original fresh oil, on the other hand, usually possesses a bland or buttery flavor, which may be associated with one or more flavors that are characteristic of the particular type of oil. The stabilizer of this invention is particularly valuable, not only in suppressing the intensity of the flavor of the oils, as measured by the flavor scores of Table I, but also in preserving the quality of the flavor. The flavor responses, recorded by the taste panel in evaluating oils No. 6 and No. 7 are shown in Table III, with respect to a typical soybean oil (oil No. 6). The table also includes a summary of the flavor responses recorded for oil No. 7, a superior commercial refined soybean oil.

Table III

| Response | Oil No. 6 + 0.01% carboxymethyl mercaptosuccinic acid | | | Oil No. 6, control | | | Oil No. 7 | | |
|---|---|---|---|---|---|---|---|---|---|
| | 0 time | Stores 4 days at 60° C. | Stored 8 days at 60° C. | 0 time | Stored 4 days at 60° C. | Stored 8 days at 60° C. | 0 time | Stored 4 days at 60° C. | Stored 8 days at 60° C. |
| Bland | 4 | 1 | 1 | 2 | 0 | 0 | 0 | 0 | 0 |
| Buttery | 7 | 6 | 3 | 4 | 0 | 0 | 7 | 2 | 0 |
| Beany | 3 | 4 | 5 | 3 | 3 | 1 | 1 | 3 | 1 |
| Grassy | 0 | 0 | 2 | 0 | 4 | 2 | 2 | 2 | 0 |
| Rancid | 0 | 2 | 5 | 0 | 6 | 3 | 3 | 7 | 7 |
| Painty | 0 | 0 | 0 | 0 | 3 | 4 | 2 | 1 | 7 |
| Metallic | 0 | 1 | 0 | 0 | 1 | 1 | 1 | 0 | 0 |
| Melon | 0 | 0 | 0 | 0 | 0 | 0 | 1 | 1 | 0 |
| Other | 0 | 2 | 1 | 2 | 0 | 4 | 1 | 2 | 2 |

The stabilizing effect of carboxymethyl mercaptosuccinic acid has been explained in part in the foregoing specification by the ability of the stabilizer to nullify the deleterious effects of metal autoxidation catalysts present in the oil. It is to be understood that this invention is not limited to such explanation, inasmuch as we have found that the stabilizer is effective in preserving the odor and taste of the oils without specific dependence on the presence of autoxidation catalysts.

We claim:

1. In a process for refining a glyceride oil which includes the step of steam deodorization, the improvement which comprises adding to the oil 0.001 to 0.1 percent carboxymethyl mercaptosuccinic acid subsequent to said deodorization at a time during the cooling of the oil from said deodorization.

2. The process of claim 1 in which the stabilizer is added at temperatures below 100° C.

3. The process of claim 2 in which the glyceride oil is cottonseed oil.

4. The process of claim 2 in which the glyceride oil is peanut oil.

5. The process of claim 1 in which the glyceride oil is soybean oil.

ARTHUR W. SCHWAB.
PATRICIA M. COONEY.
CYRIL D. EVANS.

References Cited in the file of this patent

UNITED STATES PATENTS

| Number | Name | Date |
|---|---|---|
| 2,397,976 | O'Leary | Apr. 9, 1946 |
| 2,503,401 | Mattano et al. | Apr. 11, 1950 |